United States Patent
Issler

(10) Patent No.: US 6,632,049 B2
(45) Date of Patent: Oct. 14, 2003

(54) DEVICE FOR TRANSFERRING PULVERULENT MATERIALS

(75) Inventor: Thomas Issler, Verin (FR)

(73) Assignee: Sotic Mecanique, Condrieu (FR)

( * ) Notice: Subject to any disclaimer, the term of this patent is extended or adjusted under 35 U.S.C. 154(b) by 0 days.

(21) Appl. No.: 10/184,400

(22) Filed: Jun. 27, 2002

(65) Prior Publication Data

US 2002/0172566 A1 Nov. 21, 2002

Related U.S. Application Data

(63) Continuation of application No. PCT/FR01/03361, filed on Oct. 29, 2001.

(51) Int. Cl.[7] .............................................. B65G 53/16
(52) U.S. Cl. ..................... 406/86; 406/144; 406/145; 406/194
(58) Field of Search ........................... 406/86, 88, 92, 406/144, 145, 194

(56) References Cited

U.S. PATENT DOCUMENTS

| 1,439,722 A | * | 12/1922 | Allyn | 406/144 |
| 1,892,920 A | * | 1/1933 | Weiss | 406/194 |
| 2,285,216 A | * | 6/1942 | Lundgren | 406/67 |
| 3,149,884 A | * | 9/1964 | Jones | 406/138 |
| 4,095,847 A | | 6/1978 | Wear | |
| 4,381,897 A | * | 5/1983 | Arbeletche et al. | 406/93 |
| 4,462,777 A | * | 7/1984 | Watanabe et al. | 425/87 |
| 4,762,668 A | * | 8/1988 | Loose et al. | 376/310 |
| 5,117,531 A | | 6/1992 | Hentzschel | |

FOREIGN PATENT DOCUMENTS

| CH | 415 456 A | 6/1966 | |
| DE | 25 16 402 A | 10/1976 | B65G/53/14 |
| DE | 94 10 491 | 8/1994 | B05B/14/18 |
| EP | 0268059 | 5/1988 | F23J/7/00 |
| FR | 701 793 A | 3/1931 | |
| FR | 1 356 212 | 3/1964 | 851/464 |

* cited by examiner

Primary Examiner—Joseph A. Dillon
(74) Attorney, Agent, or Firm—Heslin Rothenberg Farley & Mesiti P.C.; John Pietrangelo

(57) ABSTRACT

A device for transferring pulverulent material, for example, powdery material, including an enclosure (3) wherein the pulverulent material to be transferred is stirred and pressurized; a first pipe (8) and a second pipe (9) which transport the material towards its destination; and a gas intake (14, 15) for introducing gas to the second pipe (9). In one aspect of the invention, pipe (8) forms a nozzle (12), oriented in the direction of the material flow and directed toward second pipe (9). The gas intake (14, 15) may emerge at the lower end of the first pipe (8), outside the nozzle (12), wherein the gas is introduced into the second pipe (9) through a plurality of through orifices (20) oriented substantially parallel to the flow direction of the pulverulent material.

20 Claims, 4 Drawing Sheets

DEVICE FOR TRANSFERRING PULVERULENT MATERIALS

CROSS REFERENCE TO RELATED APPLICATIONS

This application is a continuation of PCT application PCT/FR01/03361 filed on Oct. 29, 2001, and published in French as PCT WO 02/36468. PCT/FR01/03361 claimed priority from French application FR 00.14100 filed on Nov. 3, 2000. The entire disclosures of these applications are incorporated by reference herein.

The invention relates to an improved device making it possible to optimize the transfer of pulverulent materials of varied particle sizes. It relates moreover more specifically to the feeding of pressurized pulverulent material to a pan of a molten metal, for example intended for the casting of metal parts, and more specifically aluminum parts.

As is known, transferring pulverulent materials constitutes a problem, given the physical nature of the material to be transported. This problem is even exacerbated if the particle sizes of the material are not homogeneous. Specifically, these differences in particle size may give rise to local plugs, obviously affecting the transfer proper.

In numerous technologies employing metals, and in particular aluminum foundries, a powder under pressure, with variable particle sizes typically lying between a few tenths and 5 to 10 millimeters, is incorporated in order to enhance the qualities of the aluminum, both from the porosity standpoint and from the mechanical standpoint.

This powder is generally of acid pH and is intended to be mixed with the molten metal in order to optimize its required qualities according to the parts to be produced.

The incorporation of powder into molten metal has long been carried out empirically and manually, in particular by means of ladle-shaped containers of relatively large dimensions, which did not allow reproducibility of the additions thus performed, and hence led to final parts of inhomogeneous quality. Furthermore, the use of a ladle with baths of molten metals makes human protection very precarious, and leads to numerous accidents, and in particular burns.

Automatic facilities allowing the conveying of said pressurized powder from a receptacle by means of appropriate pipes has thus been proposed, the transport of said powder being performed under pressure of an inert gas, in particular argon.

Even so, having regard to the characteristics of the powder, and in particular, given its very inhomogeneous particle sizes, satisfactory progress of the powder through the pipes is not achieved and, consequently, the required quantity is not obtained with regard to the molten metal, and neither is the prescribed quality obtained with regard to the final part to be produced.

The object of the invention is therefore firstly, to propose a device making it possible to transfer pulverulent materials of variable particle sizes with the aid of a pressurized fluid. Additionally, it is aimed at a device which makes it possible to overcome the various abovementioned drawbacks.

It proposes a device for transferring pulverulent materials, comprising:
- an enclosure in which the pulverulent material to be transferred is stirred and pressurized, at the lower end of which enclosure a pipe conveys said material toward its place of destination;
- a gas inlet, and in particular a compressed air inlet, emerging in the pipe, and the inflow being able to ensure the progress of the material toward said place.

This is device characterized in that at the level of the gas inlet, said pipe forms a nozzle, pointing in the direction of the flow of the material, said nozzle emerging into a second pipe, of substantially the same diameter as the first, and in that the gas inlet emerges at the lower end of the first pipe, outside the nozzle, said gas being introduced into the second pipe by means of a plurality of through-orifices made substantially in the same plane as the lower end of the nozzle and oriented substantially parallel to the direction of flow of the pulverulent material.

Stated otherwise, the invention consists firstly in giving the pipe a particular profile, especially a nozzle shape, which is known to impart an increase in velocity to a flowing fluid, this increase in velocity being moreover optimized on account of the orientation of the gaseous flux intended to ensure progress of the pulverulent material.

According to one feature of the invention, the device comprises two gas intakes, distributed in a diametral manner with respect to the pipe.

Moreover, the securing of the first and of the second pipes is obtained by means of a ring, at which the gas inlet pipes terminate.

As already stated, the invention is more specifically aimed at the feeding of pressurized powder to a bath of molten metal.

This device for feeding powder under pressure to a bath of molten metal, comprising:
- an enclosure in which the powder is stirred and pressurized, which enclosure at the lower end of a pipe conveys the powder toward the bath of molten metal;
- an inert gas inlet, emerging in the pipe, and the inflow being able to ensure the progress of the powder toward said bath;

is characterized in that at the level of the inert gas inlet, said pipe forms a nozzle pointing in the direction of the flow of the powder, said nozzle emerging into a second pipe, of substantially the same diameter as the first, and in that the inert gas inlet emerges at the lower end of the first pipe outside the nozzle, said gas being introduced into the second pipe by means of a plurality of through-orifices made substantially in the same plane as the lower end of the nozzle and oriented substantially parallel to the direction of flow of the powder.

According to the invention, the two pipes are secured to one another by means of rings. One of the rings is moreover furnished with two lateral orifices, diametrally distributed with respect to its generatrix, at which orifices the inert gas inlets terminate. Obviously, the device can comprise more than two inert gas inlets, and under this assumption, the ring in question is furnished with as many lateral orifices.

Additionally, said ring comprises a partition, oriented perpendicularly with respect to the direction of flow of the powder, and drilled on the one hand with a central orifice, so as to allow the introduction at this level of the lower end of the nozzle and on the other hand, with through-orifices, peripheral with respect to the central orifice, and oriented parallel to said direction of flow, and intended to allow the passage of the pressurized gas toward the pipe.

According to the invention, this device is more especially intended for aluminum foundries.

The manner in which the invention may be embodied and the advantages which stem therefrom will emerge more clearly from the exemplary embodiment which follows given by way of nonlimiting indication in support of the appended figures.

The invention is more especially described in conjunction with a device for feeding a bath of liquid metal with a pulverulent material. Even so, it shall not be limited to this application alone, and any device for transferring pulverulent material is also covered by the present invention.

Figure 1:
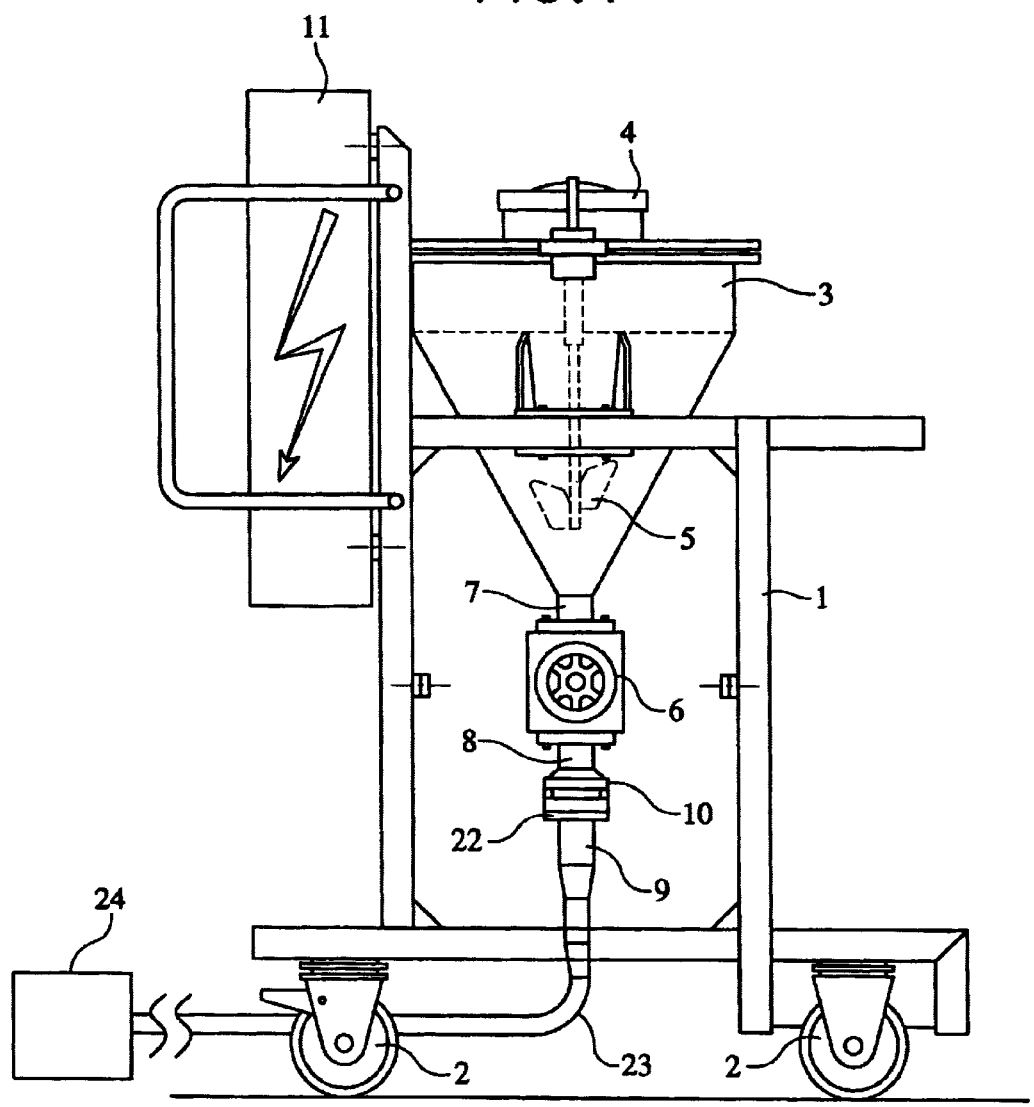
FIG. 1 is a lateral view of the facility in accordance with the invention.
Figure 2:
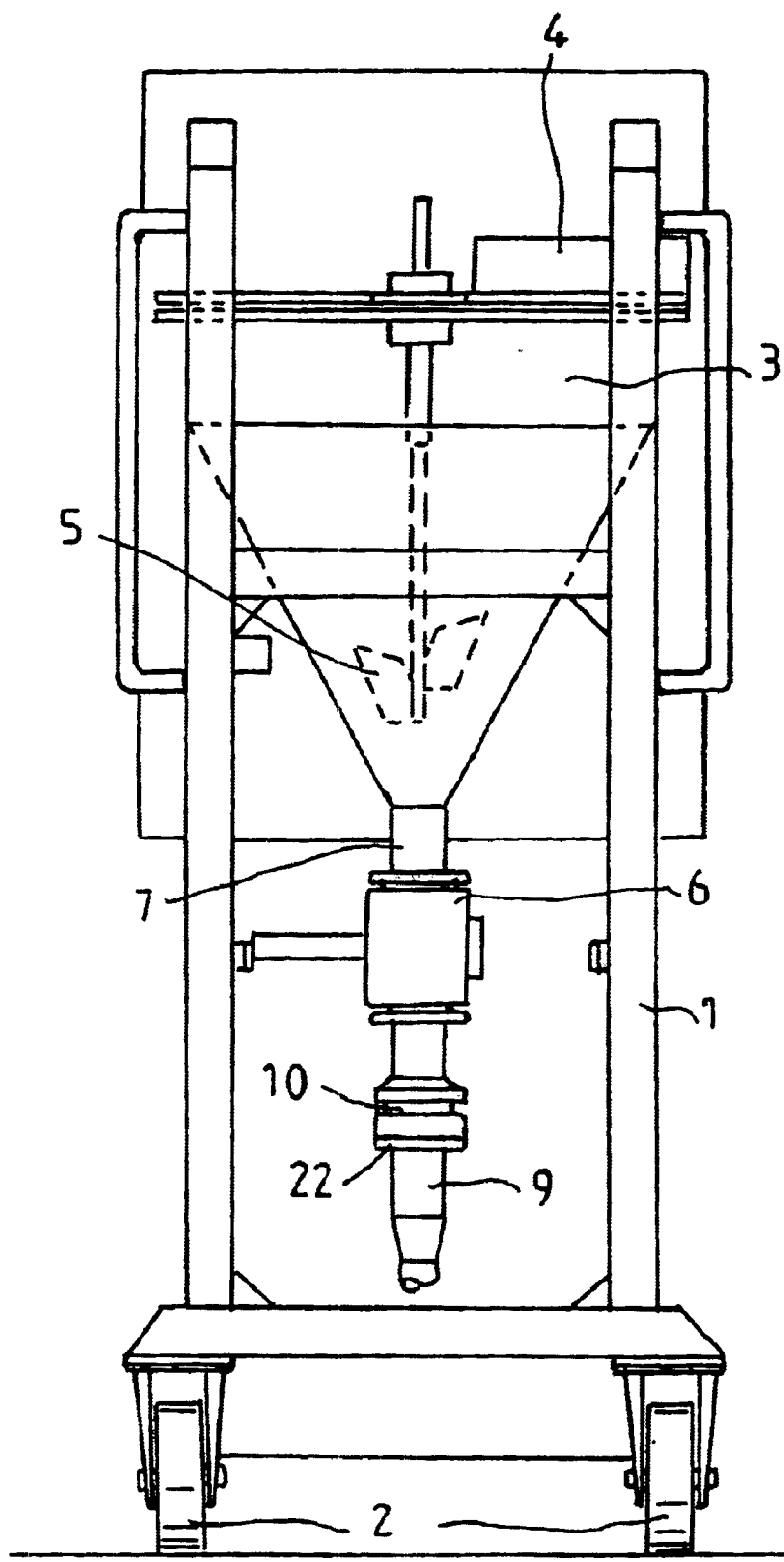
FIG. 2 is a front view of the facility of FIG. 1.

Represented in FIG. 1 is a lateral view of the facility in accordance with the invention. The latter consists basically of a chassis (1) mounted on castors (2) so as to allow movement thereof, one or more of the castors being furnished with a braking system, with a view to enhancing the stability of the assembly.

This tubular or metallic chassis (1) receives an enclosure (3), in this instance of frustoconical shape, within which is stored the powder of acid pH to be incorporated into the molten metal, for example, aluminum. The powder is transferred via a conduit (23) to its place of destination (24), for example, to a bath of molten metal.

This powder, not represented, is stirred by means of a bladed stirrer (5) propelled by an electric motor, also not represented. This enclosure (3) is furnished with an access and filling hatch positioned on its upper face and capable of being closed off by means of a leaktight cover (4) so as to be able to keep the powder under pressure.

The lower end (7) of the vessel (3), of smaller diameter, is extended via a first pipe (8) of specified diameter. Nevertheless, and advantageously, a cellular feeder (6) intended to calibrate in a known and specified manner the quantity of powder to be injected into the molten metal is interposed between the lower end (7) and the first pipe (8). Such cellular feeders are in themselves well known, so that there is no reason to describe them here in greater detail.

They consist of semicylindrical cells made in this instance of polytetrafluoroethylene (Teflon—registered trademark), the quantity required being ensured with respect to the stainless steel outer cylindrical jacket. Thus, depending on the speed of rotation of the cellular feeder (6), a known and reproducible metering of the powder into the molten metal is achieved.

This cellular feeder (6) is advantageously managed by means of a programmable controller, whose electrical cabinet has been represented by the reference (11).

Figure 3:
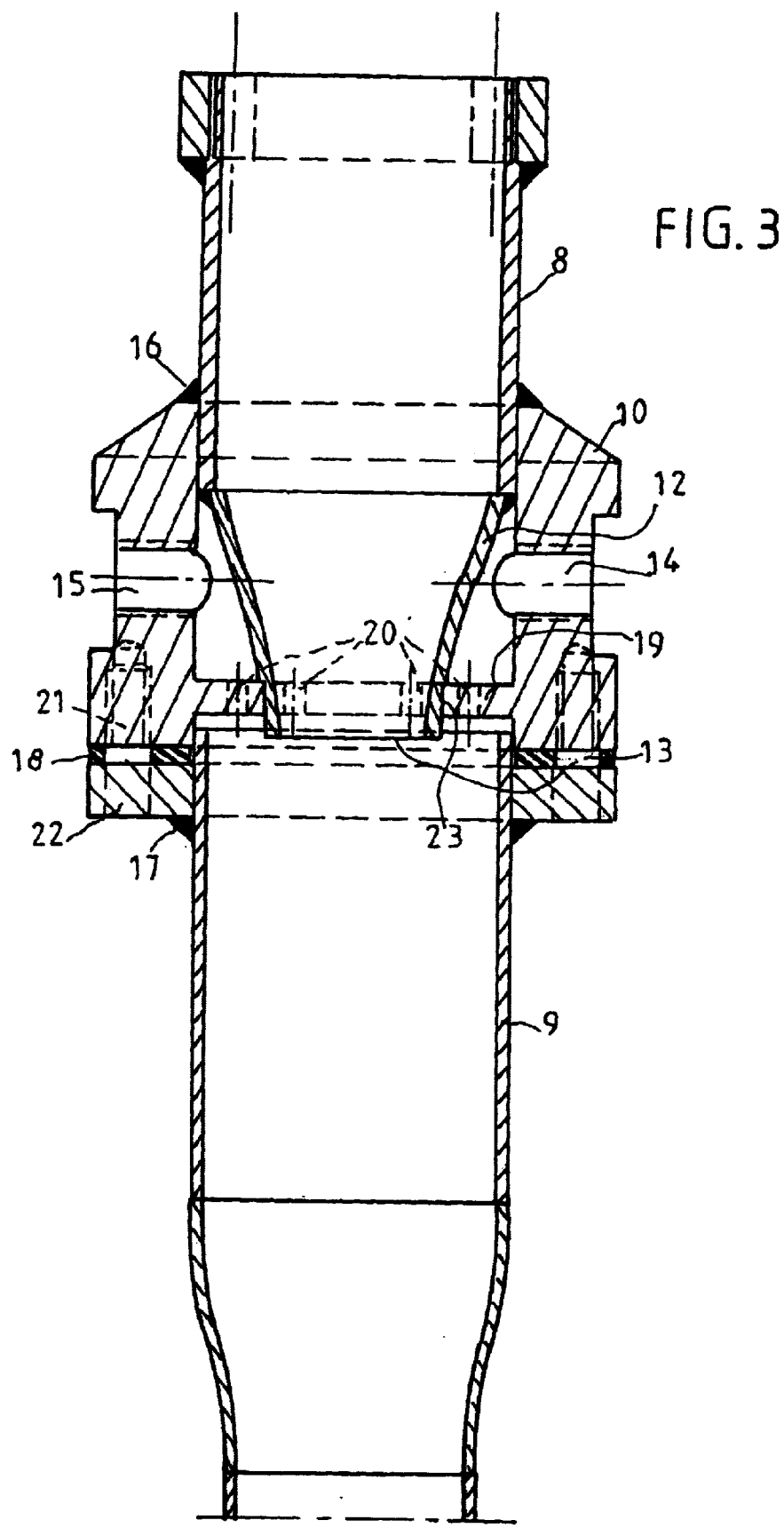
FIG. 3 is a longitudinal sectional view of the device in accordance with the invention.
Figure 4:
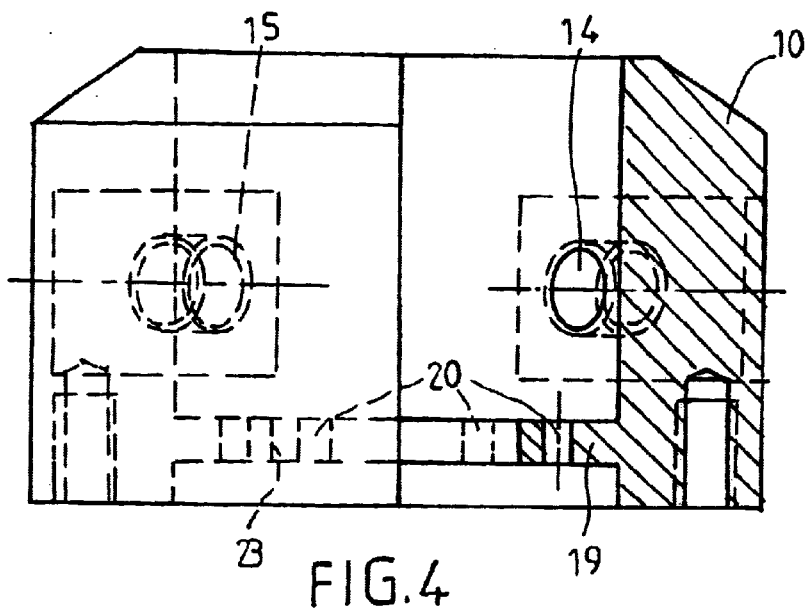
FIG. 4 is a diagrammatic view partially representing the ring for securing two pipes, in accordance with the invention.

According to one feature of the invention, and as may clearly be observed in FIG. 3, the lower end of the first pipe (8) terminates in a nozzle (12), whose own lower end (13) terminates in a second pipe (9), of identical or substantially identical diameter to that of the pipe (8). These two pipes are secured to one another by means of two rings (10, 22), as may be clearly observed in FIG. 3. This nozzle, as already stated, makes it possible to increase the speed of flow of the powder at this level, and consequently in the pipe (9).

In parallel, two inlet pipes (14) and (15) for inert gas, in particular argon, under specified pressure, terminate level with the ring (10). For this purpose, the ring (10) is furnished with two lateral orifices, distributed diametrally with respect to its generatrix, at which orifices the inert gas pipes (14, 15) terminate.

The pressure is in fact dependent on the flow rate, the latter being managed by means of variable flow rate valves (known as SMCs), powered at 0–10 volts by the programmable controller (11). As may be observed in FIG. 3, the gas arrives level with the ring (10), outside the nozzle (12) and is introduced at the level of the pipe (9) substantially at the same level as the lower end (13) of the nozzle. To do this, the ring (10) is provided with a partition (19) perpendicular to the direction of flow of the powder, drilled on the one hand with a central orifice (23), so as to allow the introduction at this level of the lower end (13) of the nozzle (12) and on the other hand, with peripheral through-orifices (20), oriented parallel to said direction of flow, and intended to allow the passage of the pressurized gas toward the pipe (9).

Figure 5:
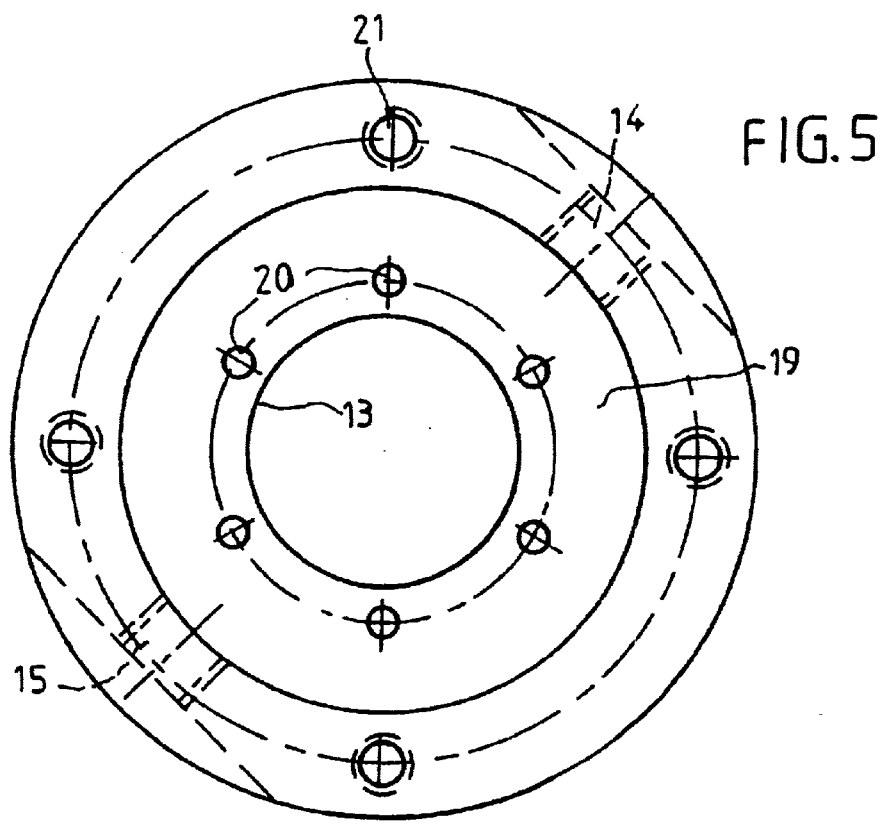
FIG. 5 is a view of the underneath of said ring.

Represented in FIG. 5 is a view of the underneath of said ring (10), in which six of these orifices (20) have been represented. Obviously, the number indicated is purely exemplary and in no way limiting.

The pipe (9) is fixed to the pipe (8) by way of a ring (22) fitted to the ring (10) by means of screws inserted into tapped or threaded orifices (21) made within the ring (10).

In parallel, O-ring seals or lip seals (16), (17) and (18) are installed so as to ensure leaktightness, in particular with regard to the inert gas, and hence the facility as a whole.

Experience proves that, on account of the particular orientation of the gaseous flux, and the installing of this nozzle, much easier progress of the powder within the pipe is achieved and, consequently, more accurate calibration is achieved during its introduction into the molten metal.

Additionally, it has also been possible to show that this particular device turned out to be most especially suitable for transferring pulverulent materials which are liable to exhibit varied particle sizes.

What is claimed is:

1. A device for transferring a pulverulent material, comprising:

an enclosure having a lower end connected to a first pipe which conveys said material toward the material's place of destination; and a gas inlet for introducing a gas, at a level, to progress the material toward said place of destination;

characterized in that at the level of the gas inlet, said first pipe forms a nozzle, pointing in the direction of the flow of the material, said nozzle emerging into a second pipe, of substantially the same diameter as the first pipe, wherein the gas inlet emerges adjacent the lower end of the first pipe, outside the nozzle, said gas being introduced into the second pipe by a plurality of through-orifices, the through-orifices positioned substantially in the same plane as the lower end of the nozzle and oriented substantially parallel to the direction of flow of the pulverulent material.

2. The device for transferring a pulverulent material as claimed in claim 1, characterized in that the device comprises two gas inlets, distributed in a diametral manner with respect to the first pipe.

3. The device for transferring a pulverulent material as claimed in claim 1, characterized in that the first pipe and the second pipe are secured to one another by means of at least one ring.

4. The device for transferring a pulverulent material as claimed in claim 3, characterized in that the ring is furnished with two lateral orifices, diametrally distributed with respect to the generatrix of the ring.

5. The device for transferring a pulverulent material as claimed in claim 3, characterized in that the ring comprises a partition oriented perpendicularly with respect to the direction of flow of the pulverulent materials, the partition having a central orifice adapted to accept the nozzle and having the plurality of through-orifices, the through-orifices positioned peripheral with respect to the central orifice, and the through-orifices adapted to allow the passage of the gas toward the second pipe.

6. The device for transferring a pulverulent material as claimed in claim 1, characterized in that the device further comprises, between the lower end of the enclosure and the ring, a cellular feeder, the feeder adapted to deliver calibrated and defined quantities of said material.

7. The device for transferring a pulverulent material as claimed in claim 1, characterized in that the device further comprises a programmable controller.

8. A device for feeding a powder to a bath of molten metal, comprising:

an enclosure having a lower end connected to a first pipe which conveys the powder toward the bath of molten metal;

an inert gas inlet for introducing a gas, at a level, to progress the powder toward said bath;

characterized in that at the level of the inert gas inlet, said first pipe forms a nozzle pointing in the direction of the flow of the powder, said nozzle emerging into a second pipe, of substantially the same diameter as the first pipe, wherein the inert gas inlet emerges at the lower end of the first pipe outside the nozzle, said gas being introduced into the second pipe (9) by a plurality of through-orifices, the through-orifices positioned substantially in the same plane as the lower end of the nozzle and oriented substantially parallel to the direction of flow of the powder.

9. The device for feeding a powder to a bath of molten metal as claimed in claim 8, characterized in that the device comprises two gas inlets, distributed in a diametral manner with respect to the first pipe.

10. The device for feeding a powder to a bath of molten metal as claimed in claim 8, characterized in that the first pipe and the second pipe are secured to one another by means of at least one ring.

11. The device for feeding a powder to a bath of molten metal as claimed in claim 10, characterized in that the ring is furnished with two lateral orifices, diametrally distributed with respect to the generatrix of the ring.

12. The device for feeding a powder to a bath of molten metal as claimed in claim 10, characterized in that the ring comprises a partition oriented perpendicularly with respect to the direction of flow of the powder, the partition having a central orifice adapted to accept the nozzle and having the plurality of through-orifices, the through-orifices positioned peripheral with respect to the central orifice, and the through-orifices adapted to allow the passage of the gas toward the second pipe.

13. The device for feeding a powder to a bath of molten metal as claimed in claim 8, characterized in that the device is adapted for use in aluminum foundries.

14. The device for feeding a powder to a bath of molten metal as claimed in claim 8, characterized in that the device further comprises, between the lower end of the enclosure and the ring, a cellular feeder, the feeder adapted to deliver calibrated and defined quantities of the powder to the bath of molten metal.

15. The device for feeding a powder to a bath of molten metal as claimed in claim 8, characterized in that the device further comprises a programmable controller.

16. The device for transferring a pulverulent material as claimed in claim 1, characterized in that the gas comprises a compressed gas.

17. The device for feeding a powder under pressure to a bath of molten metal as claimed in claim 8, characterized in that the gas comprises a compressed gas.

18. The device for transferring a pulverulent material as claimed in claim 1, further comprising a stirrer for stirring the pulverulent material.

19. The device for feeding a powder under pressure to a bath of molten metal as claimed in claim 8, further comprising a stirrer for stirring the powder.

20. The device for transferring a pulverulent material as claimed in claim 16, wherein the compressed gas comprises a compressed inert gas.

* * * * *